United States Patent [19]

Levresse

[11] Patent Number: 4,795,854

[45] Date of Patent: Jan. 3, 1989

[54] HIGH PRESSURE SEPARATION PROCESS

[75] Inventor: Bernard Levresse, Lillebonne, France

[73] Assignee: Societe Chimique des Charbonnages - CdF Chimie, France

[21] Appl. No.: 523,030

[22] Filed: Aug. 15, 1983

Related U.S. Application Data

[60] Continuation of Ser. No. 262,641, May 11, 1981, abandoned, which is a division of Ser. No. 973,940, Dec. 28, 1978, Pat. No. 4,289,512.

[30] Foreign Application Priority Data

Dec. 28, 1977 [FR] France ................ 77 39506

[51] Int. Cl.$^4$ .................................................. C07C 7/00
[52] U.S. Cl. .................................................. 585/800
[58] Field of Search .................... 55/315; 201/12; 585/808

[56] References Cited

U.S. PATENT DOCUMENTS

| | | | |
|---|---|---|---|
| Re. 20,931 | 11/1938 | Ruthruff ................ | 585/502 X |
| 1,940,227 | 12/1933 | Plummer ................ | 585/502 X |
| 2,353,119 | 7/1944 | Workman ................ | 585/502 X |
| 4,070,250 | 1/1978 | Choi ................ | 201/12 |
| 4,087,602 | 5/1978 | Mietzner et al. ................ | 585/502 X |
| 4,093,795 | 6/1978 | Buechner et al. ................ | 585/502 X |
| 4,151,044 | 4/1979 | Choi ................ | 201/12 |
| 4,289,512 | 9/1981 | Levresse ................ | 55/315 |

Primary Examiner—Robert V. Hines
Attorney, Agent, or Firm—Finnegan, Henderson, Farabow, Garrett & Dunner

[57] ABSTRACT

A device for separating a high pressure polyphase mixture consisting of a gas charged with liquid particles, and particularly a mixture of ethylene and polyethylene, which comprises a cylindrical vertical enclosure into which extends an inlet means for supplying the mixture thereto and which is provided at its lower end with an outlet for discharging separated liquids; a vertical cyclone in communication with the enclosure for receiving separated gases therefrom and having an outlet at its upper end for discharging gases separated in the cyclone and a liquid outlet at its lower end for discharging separated liquids therefrom; and an ejector comprising a nozzle, through which the polyphase mixture is fed, a mixing zone connected to the liquid outlet of the cyclone and a diffuser section for reducing the speed of the resultant mixture and being connected to the inlet means for supplying the polyphase mixture to the enclosure.

8 Claims, 1 Drawing Sheet

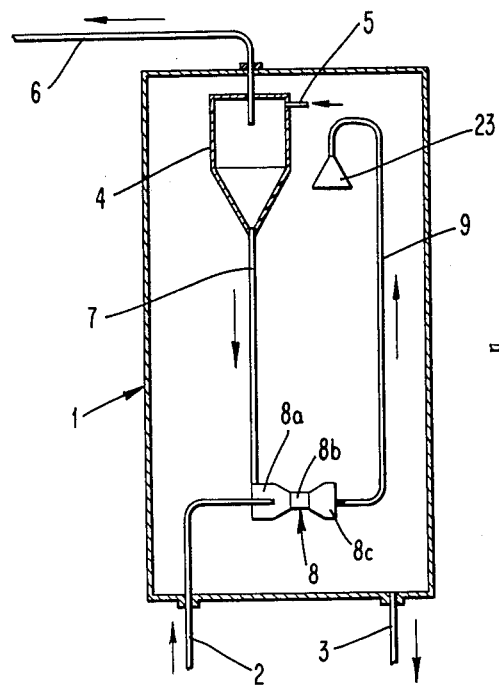
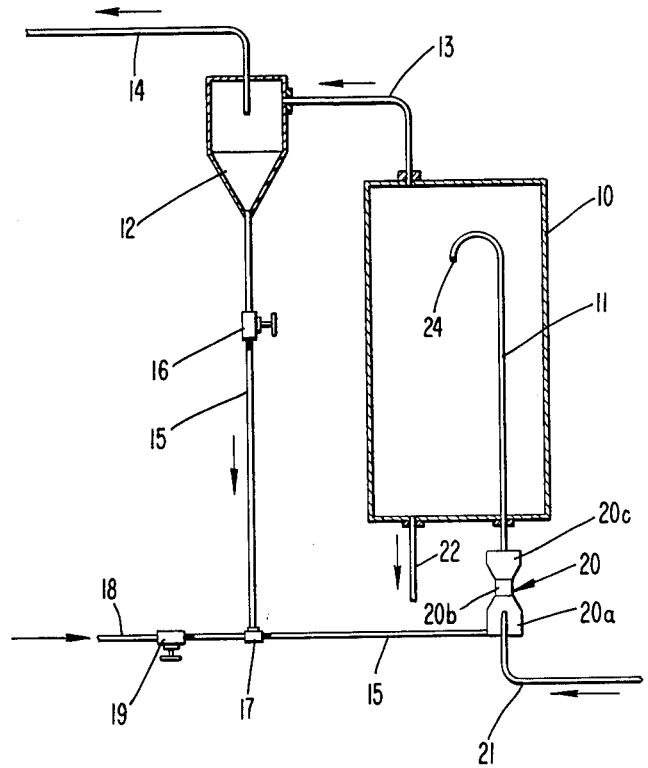
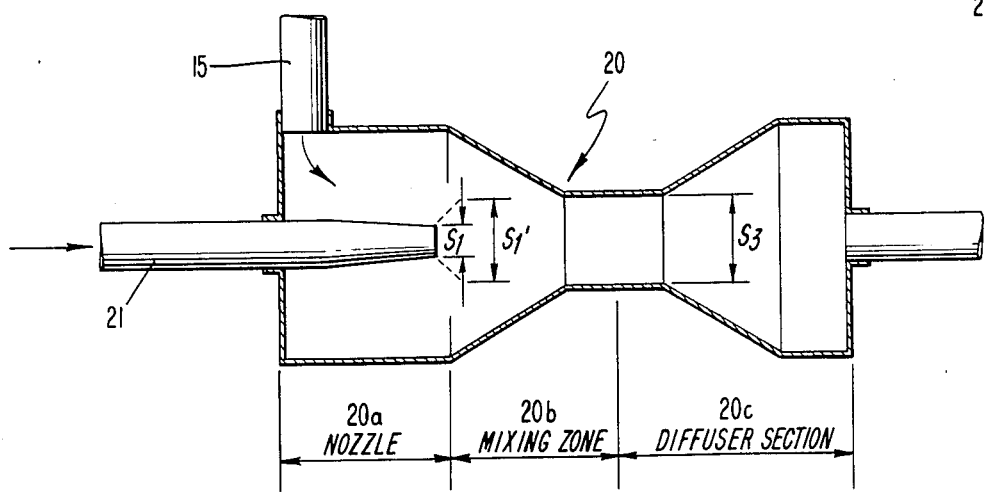

HIGH PRESSURE SEPARATION PROCESS

This application is a continuation of application Ser. No. 262,641, and now abandoned, filed May 11, 1981 which is a division of application Ser. No. 973,940, filed Dec. 12, 1978 and now U.S. Pat. No. 4,289,512.

This invention relates to a high pressure separation device for treating partially miscible fluids.

In high pressure synthesis operations in the chemical industry, it is desirable, when the degree of conversion is low, to separate the phases under pressure in order to be able to immediately recycle the unconverted phase.

A high pressure separation device is known which consists of a vertical cylindrical enclosure and in which the mixture to be separated is fed into the enclosure by means of a tangential inlet that is substantially halfway up the cylinder. The main disadvantage of this device lies in the fact that since it operates by reducing the circulation speed of the fluids and by separation under gravity, its efficiency is proportional to its volume, which leads to bulky, heavy and expensive devices.

U.S. Pat. No. 3,917,473 also describes a high pressure separator which comprises a vertical cylindrical enclosure provided with a cover and carrying a vessel in the form of an elongated bell extending inside the enclosure. The vessel contains a coaxial inner cylinder and forms, together with the cylinder, an annular space into which the feed pipe opens.

An object of the present invention is to provide a new and improved high pressure separation device, the efficiency of which, by virtue of a different type of operation from the above conventional devices, is not directly related to its volume.

In accordance with the present invention, a device is provided for separating a polyphase mixture under high pressure and consisting of a gas charged with liquid particles, which device comprises:

(a) a vertical cylindrical enclosure having inlet means for supplying the polyphase mixture to the enclosure that opens into said enclosure and an outlet at its lower end for discharging separated liquids therefrom;

(b) a vertical cyclone in communication with said enclosure for receiving separated gases therefrom, said cyclone having a gas outlet at its upper end for discharging separated gases therefrom and a liquid outlet at its lower end for discharging separated liquids; and (c) an ejector comprising a nozzle through which the polyphase mixture is fed to increase its speed, a mixing zone connected to the liquid outlet of the cyclone for entraining the separated liquids from said cyclone in the polyphase mixture and a diffuser section for reducing the speed of the resultant mixture, said diffuser section of the ejector being connected to the inlet means for supplying the polyphase mixture to the enclosure.

The invention will be more clearly understood from the following description of embodiments of high pressure separating devices according to the invention, which are given by way of example only and illustrated in the accompanying drawings, in which:

FIG. 1 is a diagrammatic view of a first type of device according to the invention;

FIG. 2 is a diagrammatic view of a second type of device according to the invention; and FIG. 3 is an enlarged view of the ejector of FIG. 2.

The device shown in FIG. 1 comprises a vertical cylindrical enclosure 1 which is supplied with a polyphase mixture to be separated from a reactor (not shown) by a pipe 2, and is provided in its lower end with an outlet connected to a pipe 3 for discharging separated liquids. A vertical cyclone 4 is in communication with the enclosure by means of an inlet orifice 5 in the cyclone for admitting gases separated in the enclosure, and is provided in its upper end with an outlet connected to a pipe 6 for discharging gases separated in the cyclone. The cyclone has, at its base, a pipe 7 for discharging separated liquids which is directly connected to the mixing zone 8b of an ejector 8. Ejector 8 also includes a nozzle 8a, and a diffuser section 8c.

Inlet pipe 2, supplying the polyphase mixture from the reactor is connected to the nozzle 8a of ejector 8. The speed of the mixture will be increased as it exhausts the nozzle and enters mixing zone 8b to entrain the separated liquids being fed to the mixing zone from cyclone 4. Diffuser section 8c of ejector 8 then reduces the speed of the resultant liquid entrained polyphase mixture.

In accordance with the invention, inlet means are provided that are connected to diffuser section 8c that extend into and open in enclosure 1 for supplying the resultant polyphase mixture from ejector 8 to the enclosure. As embodied and as shown in FIG. 1, the inlet means comprises a tube 9 that extends parallel to the axis of the enclosure 1 into the upper portion of the enclosure and terminates in a downwardly directed cone 23 having a small angle at its apex. The size of this angle and the location of the inlet means with respect to the axis of the enclosure will be desired in more detail below.

The device shown in FIG. 2 includes a vertical cylindrical enclosure 10 into which also extends an inlet means for supplying the polyphase mixture thereto. In this embodiment, the inlet means comprises a tube 11 that extends parallel to the axis of the enclosure into the upper portion of the enclosure, the end 24 of which is bent in a direction towards the bottom of the enclosure.

A vertical cyclone 12 is connected to enclosure 10 by means of a pipe 13 in which gases separated in enclosure 10 flow. Cyclone 12 has an outlet in its upper end connected to a pipe 14 for discharging separated gases. The cyclone also has, at its base, a pipe 15 for discharging separated liquids. As in FIG. 1, pipe 15 is connected, via valve 16 and through a connection 17 with a branch pipe 18, to the mixing zone 20b of an ejector 20. Branch pipe 18 is connected to a source of gas as more fully described below and, by means of a valve 19 and connection 17, allows gas to be fed to ejector 20.

As shown in FIG. 1 and in more detail in FIG. 3, ejector 20 comprises a nozzle 20a, mixing zone 20b and a diffuser section 20c that is connected to inlet tube 11. The nozzle of ejector 20 is connected to a pipe 21 for supplying the polyphase mixture from the high pressure reactor (not shown) to the enclosure. Finally, enclosure 10 is provided with a pipe 22 for discharging the separated liquids.

In use, the nozzle of the ejector which supplies the enclosure with the polyphase mixture is connected, via a valve, to a reactor for high pressure synthesis. As regards the separating device, the term high pressure is to be understood as meaning pressures of between 50 and 500 bars. Of course, the pressure in the synthesis reactor can be very much greater than these values and even reach several thousand bars.

As discussed above, the inlet means for supplying the polyphase mixture to the enclosure may take a number of different forms. The inlet means may be of the conventional type, that is to say, a device having a tangential inlet opening which is substantially halfway up the cylinder or enclosure. However, it is more advantageous to provide an inlet that is arranged such that the jet of the polyphase mixture therefrom is in a direction parallel to the axis of the cylinder. In other words, the flow of the mixture is orientated perpendicular to the interface between the phases. A cone 23 as shown in FIG. 1, which is located in the upper zone of the cylindrical enclosure 1, and of which the angle at the apex is between 4 and 30 degrees, is one example of this type of device. A cone, the end of which is closed by means of a circular diffuser disc pierced with holes, in the form of a water-can rose, is a further example.

It can also be advantageous to provide an inlet device which is arranged such that the jet of the polyphase mixture therefrom is orientated towards the interface between the phases, without being either perpendicular or parallel to this interface. A tube 11 as shown in FIG. 2, which is parallel to the axis of the cylinder, and the end 24 of which is bent in a direction which forms, with the vertical in a downward direction, an angle which is less than or equal to 80° is an example of this type of device.

The two types of high pressure separation devices discussed above and shown in FIGS. 1 and 2 are within the scope of this invention. In the first type of device as shown in FIG. 1, the vertical cyclone 4 and the ejector 8 are both placed inside the cylindrical enclosure 1. In this case, the orifice 5 in the upper part of cyclone 4 for admitting gases separated in the enclosure, has a cross-section so as to provide an entry speed which is suitable for the mixture to be separated. The pipe 7 for discharging separated liquids from the lower end of the cyclone is directly connected to the mixing zone of the ejector 8.

In the second type of device as shown in FIG. 2, the vertical cyclone 12 and the ejector 20 are both placed outside the cylindrical enclosure 10. In this case, cyclone 12 is connected to the upper end of the enclosure by a pipe 13 in which the gases separated in the enclosure 10 flow. Pipe 15 connects the separated liquids discharged from cyclone 12 with the mixing zone of ejector 20. A valve 16 controls the rate of flow of the separated liquids to ejector 20 and makes it possible, if necessary, to entrain part of the gases in addition to the separated liquids and therefore to vary the flow rate and the composition of the fluid, which is directed towards the ejector, as a function of the efficiency of the ejector, particularly when maintenance work entails the replacement of an ejector by another ejector of different geometry. Optionally, the second type of separating device includes, between valve 16 and ejector 20, branch pipe 18 joining pipe 15 at 17 for feeding gases to the liquids separated in the cyclone. This gas feed will make it possible, by means of valve 19, to vary, as above, the flow rate and the composition of the fluid directed towards ejector 20.

The present invention also relates to the application of the devices described above to an installation for the synthesis of polyethylene under high pressure. In fact, it is known to polymerize ethylene in a reactor under a pressure of 500 to 3,000 bars and at a temperature of 160° C. to 350° C., in the presence of a catalyst, to reduce the pressure of the mixture from the reactor to between 50 and 500 bars and then to separate, under this pressure, the liquid polymer and the gaseous monomer constituting this mixture. The invention therefore relates to an improved process which consists in carrying out the separation under pressure in one of the devices described above, the entry speed of the gases from the enclosure into the cyclone being between 0.5 and 20 m/second.

In this improved process, when the type of separating device as shown in FIG. 2 is used, it is particularly advantageous to provide, between the valve 16 in the pipe 15 for liquid discharged from the cyclone, and the ejector 20, a supply of ethylene gas through branch pipe 18 under a pressure which is less than the pressure prevailing in the cylindrical enclosure 10, and preferably under a pressure greater than the critical pressure of ethylene (51 bars). Preferably, the ethylene supplied to the ejector in this way is at a temperature below 120° C. and has a flow rate q which is less than 30% of the flow rate Q of polyphase mixture from the reactor. The effect of this is to cool the cylindrical enclosure considerably and therefore to slow down the course of the polymerization reaction in the enclosure.

The ejector shown in FIG. 3 and used in the process according to the invention with the type of separating device shown in FIG. 2, can be defined more precisely by the cross-section $S_1$ at the neck of the nozzle and by the cross-section $S_3$ at the neck of the diffuser. A ratio of $Q/S_1$ of between 0.20 and 1.35 tonnes/hr.mm$^2$ and a ratio of $(q+Q)/S_3$ of between 0.10 and 0.30 tonnes/hr.mm$^2$ is preferred. Advantageously downstream from the neck of the nozzle, there is provided a divergent part having a cross-section $S_1'$ at the outlet, the ratio of the cross-sections $S_1'/S_1$ being between 1 and 3.

In the improved polymerization process, when the type of separating device shown in FIG. 1 is used, the main purpose of the ejector 8 being located inside the enclosure is to recycle liquids separated in cyclone 4. Taking account of the low flow rate of these liquids, the geometry of the ejector can be defined in a less restricted manner than in the preceding case. Finally, it still remains possible and advantageous to arrange, in the pipe 2 for feeding the reactor mixture, and between the reactor and inlet tube 9 of the cylindrical enclosure, an ejector of the type defined above, fed with ethylene gas under a pressure which is less than the pressure prevailing in the cylindrical enclosure.

Regardless of which type of separating device is used in the improved process, it is advantageous to purify the gases which have been separated in the cyclone and then cooled, by passing them, at a temperature which is at least 20° C. higher than the melting point of the low polymers which they contain, into at least one standard cyclone with an entry speed of between 1 and 10 m/second, cool them again down to a temperature below the melting point of the said low polymers and pass them into at least one heated cyclone with an entry speed of between 2 and 20 m/second.

The present invention can also be applied to the copolymerization of ethylene with α-olefins, such as propylene, but-1-ene and hex-1-ene. Using a free radical catalyst, the invention can be applied to the copolymerization of ethylene with polar comonomers, such as carbon monoxide, maleic anhydride and vinyl esters. Using a transition metal compound catalyst, the invention can be applied to the terpolymerization of ethylene with an α-olefin, such as propene, and an unconjugated diolefin.

As is conventional, there may also be present in the reaction mixture one or more chain transfer agents, such as hydrogen, for adjusting and controlling the characteristics of the polymer. The reaction mixture may also contain an inert diluent when the catalyst contains a transition metal compound. This diluent may be a hydrocarbon, such as propane or butane, in an amount of 1 to 20% by weight, relative to the gaseous mixture.

Thus, in this specification, reference to gas should be understood to include a stream of ethylene which optionally contains one or more comonomers and/or one or more chain transfer agents and/or one or more inert diluents; free radical catalysts include oxygen, peroxides and per-esters; and transition metal catalyst, which include, for example, a catalyst system comprising (a) an organometallic activator, such as trialkylaluminium compound, a halogenodialkylaluminium compound or an alkylsiloxalane and (b) a halogen-containing compound of a transition metal of groups IV A to VI A of the Periodic System which may optionally be carried on a support. Among these compounds, the following may be mentioned as being the most usual: the $\pi$-allyl or $\pi$-benzyl complexes of chromium, zirconium and titanium, vanadium trichloride and titanium trichloride, optionally crystallized together with aluminium chloride and optionally supported by, or ground together with, a halogen-containing compound of magnesium or zinc. These catalysts are preferably employed in the form of solutions in an inert diluent or alternatively in the form of a dispersion.

The following examples illustrate the invention.

EXAMPLES 1 TO 3

These examples relate to the manufacture of low density polyethylene by the polymerization of ethylene under high pressure, at high temperature and in the presence of a peroxide-type radical initiator. At the outlet of the reactor, the pressure of the mixture is reduced and the mixture is supplied to a cylindrical vertical enclosure in which the pressure is 250 bars.

In Example 1, the enclosure itself constitutes the high pressure separation device. The separated gases at the upper outlet of the enclosure are therefore led directly towards a condenser.

On the other hand, in Examples 2 and 3 according to the invention, the high pressure separation device comprises in addition to the enclosure and outside the latter, a cyclone which the gases enter at a speed of 5 m/second, a branch pipe for the injection of gas and an ejector. This device therefore conforms to that shown in FIG. 2, except for the special nature of the device for feeding the mixture into the enclosure.

In Examples 1 and 2, the device has a tangential inlet of the conventional type, arranged substantially halfway up the cylinder, and in Example 3, a tube terminating in a cone of which the angle at the apex is 15°.

In Examples 2 and 3, at the outlet of the cyclone, the separated gases are directed towards a condenser, at the outlet of which the cooled gases are subjected to a further separating stage.

The efficiency of the three separating devices is measured by the amount of liquid polymer recovered in the separating stage to which the gases are subjected after cooling. In fact, it is well known that the consequence of the circulation of a considerable amount of liquid polymers in pipes which are normally provided for gases causes fouling and even blocking of the pipes. By measuring the difference between the amount recovered using the enclosure by itself and that recovered using the devices according to the invention, a good estimate of the efficiency of the latter is obtained. The amounts P indicated in the table below refer to the amount of liquid polymer recovered after cooling the gases and are expressed in grammes per tonne.

| EXAMPLE | 1 | 2 | 3 |
| --- | --- | --- | --- |
| P(g/tonne) | 1,745 | 990 | 780 |

The results show that far less liquid polymer is recovered in the separating stage using the separation devices of the present invention (Examples 2 and 3) than using just a cylindrical vertical enclosure (Example 1).

EXAMPLES 4 AND 5

These examples relate to the manufacture of high density polyethylene by the polymerization of ethylene under high pressure, at high temperature and in the presence of a Ziegler-type catalyst comprising titanium trichloride and an alkylaluminium activator. At the output of the reactor, the pressure of the liquid is reduced and the mixture is then supplied into a high pressure separation device.

In Example 4, the device employed is identical to that of Example 1 above. In Example 5, the device employed is identical to that of Example 2 above. As in the preceding examples, the efficiency of the separating devices is determined by measuring the amounts P of liquid polymers recovered after cooling the gases, expressed in grammes per tonne.

Example 4, P=300 g/tonne
Example 5, P=160 g/tonne.

What is claimed is:

1. A process for separating a polyphase effluent from an ethylene polymerization reactor operating at a pressure between 500 and 3,000 bars, at a temperature between 160° C. and 350° C., and in the presence of a catalyst, into a gaseous monomer and a liquid polymer, comprising the steps of:
   (a) feeding said polyphase effluent to an ejector comprising a nozzle through which said polyphase mixture is fed to increase its speed, a mixing zone for entraining recycled liquid polyethylene, and a diffuser section for reducing the speed of a resultant separation mixture;
   (b) introducing recycled liquid polyethylene into said mixing zone thereby forming said separation mixture;
   (c) separating said separation mixture by reducing said mixture to a pressure between 50 and 500 bars, thereby forming said liquid polymer and a partially purified gas, and removing said liquid polymer;
   (d) purifying said partially purified gas in a cyclone, thereby forming said gaseous monomer and said recycled liquid polyethylene; and
   (e) recycling said liquid polyethylene to step (b).

2. The process of claim 1, further comprising the step of adding fresh ethylene to said recycled liquid polyethylene before introducing said recycled liquid polyethylene into said mixing zone.

3. The process of claim 1, wherein said step of purifying said partially purified gas in a cyclone and said step of feeding said polyphase effluent to an ejector are both performed within an enclosure means for separating said separation mixture.

4. The process of claim 1, wherein said step of separating said separation mixture comprises discharging said mixture into an enclosure means in a direction substantially parallel to the axis of said enclosure means.

5. The process of claim 4 wherein said mixture is introduced to said enclosure means through a downward opening cone located in the upper portion of said enclosure means wherein the angle of the apex of said cone is from 4 to 30 degrees.

6. The process of claim 1, wherein said step of separating said separation mixture comprises introducing said mixture to a cylindrical enclosure means in the form of a jet, said jet being oriented with respect to the surface of said liquid polymer located within said enclosure means at an angle that is neither perpendicular nor parallel to the surface of said liquid polymer.

7. The process of claim 1, wherein said partially purified gas enters said cyclone at a speed between 0.5 and 20 m/second.

8. The process of claim 2, wherein the flow rate of said fresh ethylene added to said recycled liquid polyethylene is less than 30% of the flow rate of said polyphase mixture.

* * * * *